United States Patent [19]

Koeck

[11] Patent Number: 4,567,586
[45] Date of Patent: Jan. 28, 1986

[54] SERVICE INTEGRATED DIGITAL TRANSMISSION SYSTEM

[75] Inventor: Klaus Koeck, Backnang, Fed. Rep. of Germany

[73] Assignee: Licentia Patent-Verwaltungs-GmbH, Frankfurt am Main, Fed. Rep. of Germany

[21] Appl. No.: 327,508

[22] Filed: Dec. 4, 1981

[30] Foreign Application Priority Data

Dec. 5, 1980 [DE] Fed. Rep. of Germany ....... 3045875

[51] Int. Cl.[4] .............................................. H04B 9/00
[52] U.S. Cl. .......................................... 370/4; 370/1; 455/607; 455/612
[58] Field of Search .................. 371/66; 455/606, 607, 455/612, 608, 8, 103, 127; 340/825.01, 825.16; 370/4, 1, 3

[56] References Cited

U.S. PATENT DOCUMENTS

| 3,651,471 | 3/1972 | Haselwood et al. | 364/900 |
| 4,031,543 | 6/1977 | Holz | 455/2 |
| 4,373,206 | 2/1983 | Suzuki et al. | 455/103 |

FOREIGN PATENT DOCUMENTS

| 2538638 | 3/1977 | Fed. Rep. of Germany . |
| 2828624 | 1/1980 | Fed. Rep. of Germany . |
| 2951480 | 7/1981 | Fed. Rep. of Germany . |

OTHER PUBLICATIONS

Senmoto et al.—"A Fiber Optics Application"—NTG Fachber, vol. 73, 1980, pp. 51–55.
Chang—"Fiber Guide Systems"—Proc. of the IEEE, vol. 68, No. 10, Oct. 1980, pp. 1291–1299.
White et al., "Efficient 100 Mb/s Driver for Electroluminescent Diodes", Int. J. Electronics, 1973, vol. 35, No. 6, pp. 751–754.
Schüssler, "Dienstintegrierter Teilnehmeranschluss mit Lichtwellenleiterin", Wiss. Ber. AEG-Telefunken 53 (1980), pp. 72–79.
Bauch, "Künftige Kommunikationstechnik mit Lichtleitern", NTZ Bd. 32 (1979) Heft 3, pp. 150–153.
Cotten—Fiber Optic Digital Video Systems for Commercial Cable TV Trunking Applications—SPIE vol. 139, Guided Wave Optical Systems and Devices 1978, pp. 53–62.

Primary Examiner—Joseph A. Orsino, Jr.
Attorney, Agent, or Firm—Spencer & Frank

[57] ABSTRACT

In a service integrated, time multiplex digital signal transmission system for transmitting narrowband and broadband signals between a central exchange terminal and a subscriber terminal, which system includes a light conductor path connected between the terminals, a transmitter device at one terminal composed of signal processing circuitry connected for combining the signals provided by sources into a multiplex signal and for supplying such multiplex signal to the light conductor path, and a receiver device at the other terminal composed of signal processing circuitry connected to the light conducting path for separating received multiplex signals into narrowband signals and broadband signals, the device at the subscriber terminal being normally supplied with operating power by local utility mains, a charge accumulator connected for supplying operating power to the device at the subscriber terminal in the event of interruption of the power provided by the mains, one device is provided with an emergency transmitter for producing a narrowband signal and for supplying such signal to the light conductor path, the other device is provided with an emergency receiver for receiving the narrowband signal produced by the emergency transmitter and for receiving such signal from the light conductor path, a detector is located at one terminal for detecting a local mains power interruption, and switching members are connected between the detector and the device at the one terminal for responding to detection of such power interruption to deactivate signal processing circuitry at the one terminal and activate the emergency device at that terminal.

10 Claims, 6 Drawing Figures

SERVICE INTEGRATED DIGITAL TRANSMISSION SYSTEM

BACKGROUND OF THE INVENTION

The present invention relates to a service integrated digital transmission system for transmitting both broadband and narrowband signals.

U.S. application Ser. No. 324,662, filed by Hans-Jurgen Schmack et al on Nov. 24, 1981, and claiming priority of Federal Republic of Germany Application No. P 30 44605.0 of Nov. 27, 1980, discloses a transmission system of the above type in which the operating power is not supplied to a subscriber from the central exchange but which nevertheless has a high availability and is designed in an inexpensive and energy saving manner.

SUMMARY OF THE INVENTION

It is an object of the present invention to provide a transmission system of the above type which is available even after long periods of mains supply current interruption and which even further reduces current consumption in an inexpensive manner.

The above and other objects are achieved, according to the invention, in a service integrated, time multiplex digital signal transmission system for transmitting narrowband and broadband signals between a central exchange terminal and a subscriber terminal, which system includes means defining a light conductor path connected between the terminals, a transmitter device at one terminal composed of sources of such narrowband and broadband signals and signal processing means connected for combining the signals provided by the sources into a multiplex signal and for supplying such multiplex signal to the light conductor path, and a receiver device at the other terminal composed of signal processing means connected to the light conducting path for receiving multiplex signals from that path and separating the received multiplex signals into narrowband signals and broadband signals, the device at the subscriber terminal being normally supplied with operating power by local utility mains, a charge accumulator at the subscriber terminal connected for supplying operating power to the device at the subscriber terminal in the event of interruption of the power supply provided by the local mains, and means connected for switching the system to effect signal transmission at a reduced bit rate in the event of such local mains power interruption, by providing one of the devices with emergency transmitting means for producing a narrowband signal and connected for supplying such signal to the light conductor path, providing the other of the devices with emergency receiving means for receiving the narrowband signal produced by the transmitting means and connected for receiving such signal from the light conductor path, and providing the switching means with detector means located at one of the terminals for detecting a local mains power interruption, and switching members connected between the detector means and the device at the one terminal for responding to detection of such power interruption to deactivate the signal processing means at the one terminal and activate the emergency means at the one terminal.

The transmission system according to the invention presents the advantages that, upon the interruption of the mains operating current or malfunctions in the mains power system, the multiplexer or demultiplexer is switched to emergency transmission which is based on a circumvention of the multiplexers or demultiplexers respectively so that all component groups provided for the transmission of other, irrelevant, services, such as television, the video portion of videotelephone, stereo radio etc., can be switched off. This results in a great savings in operating power. According to the invention, only the vitally necessary emergency service such as telephone or telex is maintained.

According to one embodiment of the invention, the disconnection of further component groups during the times which are free of business, saves even more power and only the optical receiver and the detector remain activated so as to connect the disconnected component groups for an incoming or outgoing call.

Advantageously, the circumventing arrangements according to the invention, as well as the optical receiver operate, during emergency transmission with low or reduced power so that here too energy can be saved.

In both Figures, the component groups required for multiplex operation are in the regions MZ and MT, respectively.

Figure 3:
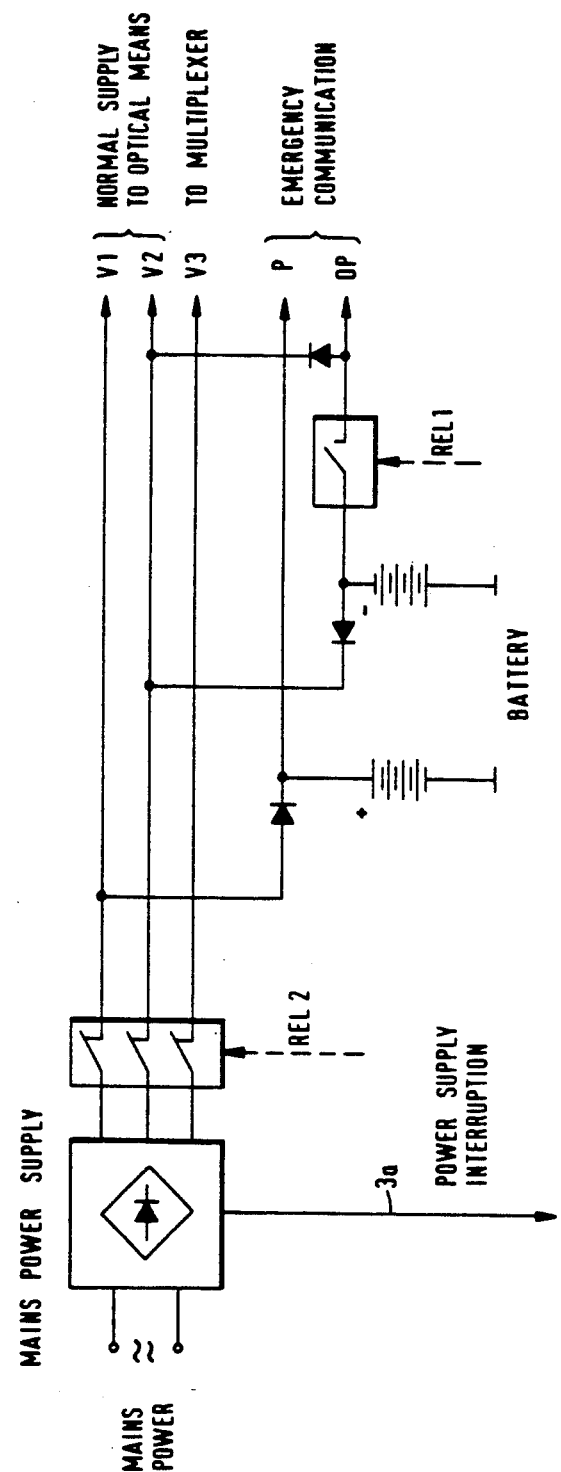

FIG. 3 shows the circuit diagram of power supply containing mains power supply and emergency battery.

Figure 4:
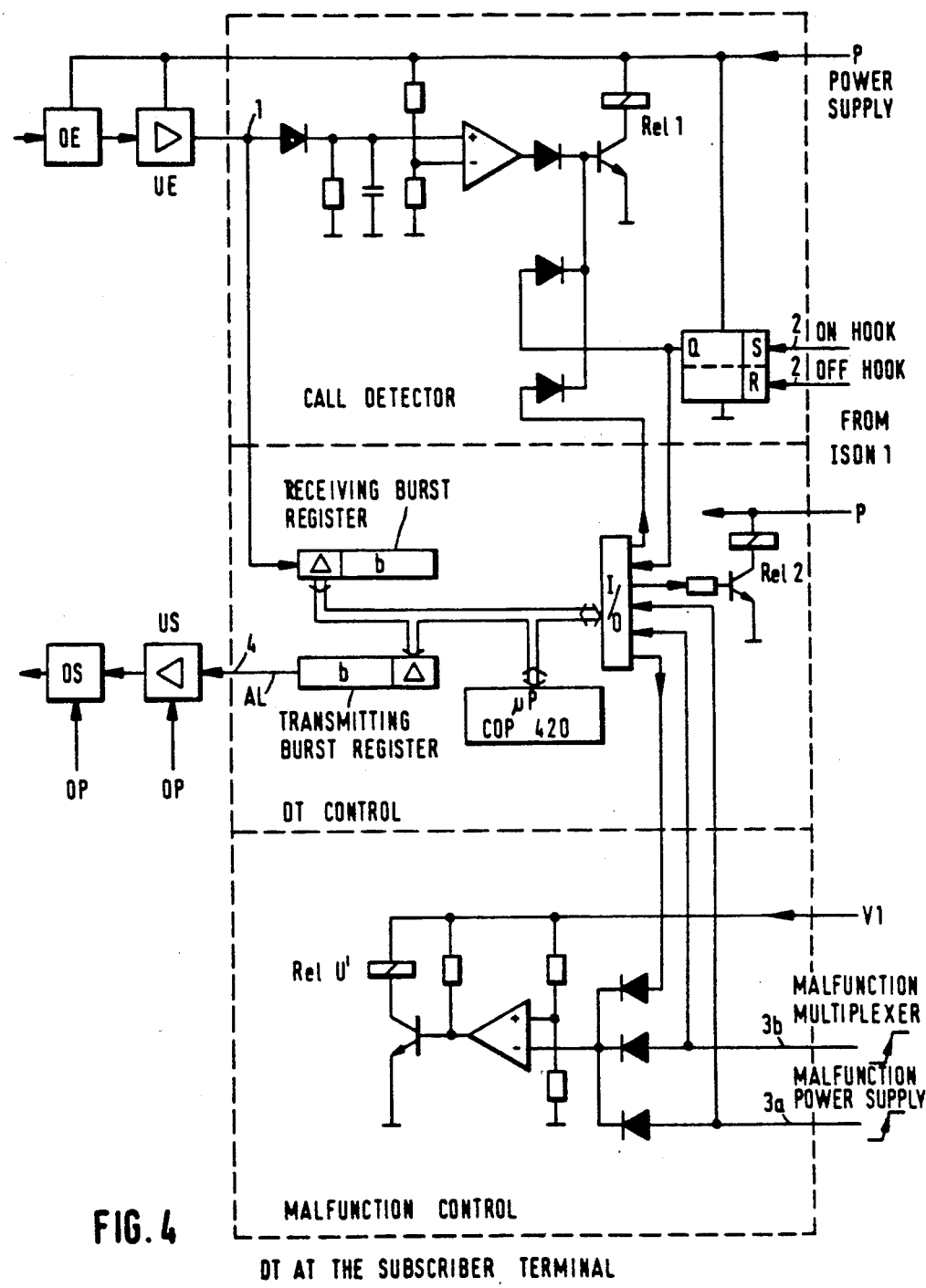

In FIG. 4 a detailed circuit diagram of detector DT at the subscriber terminal is shown.

Figure 5:
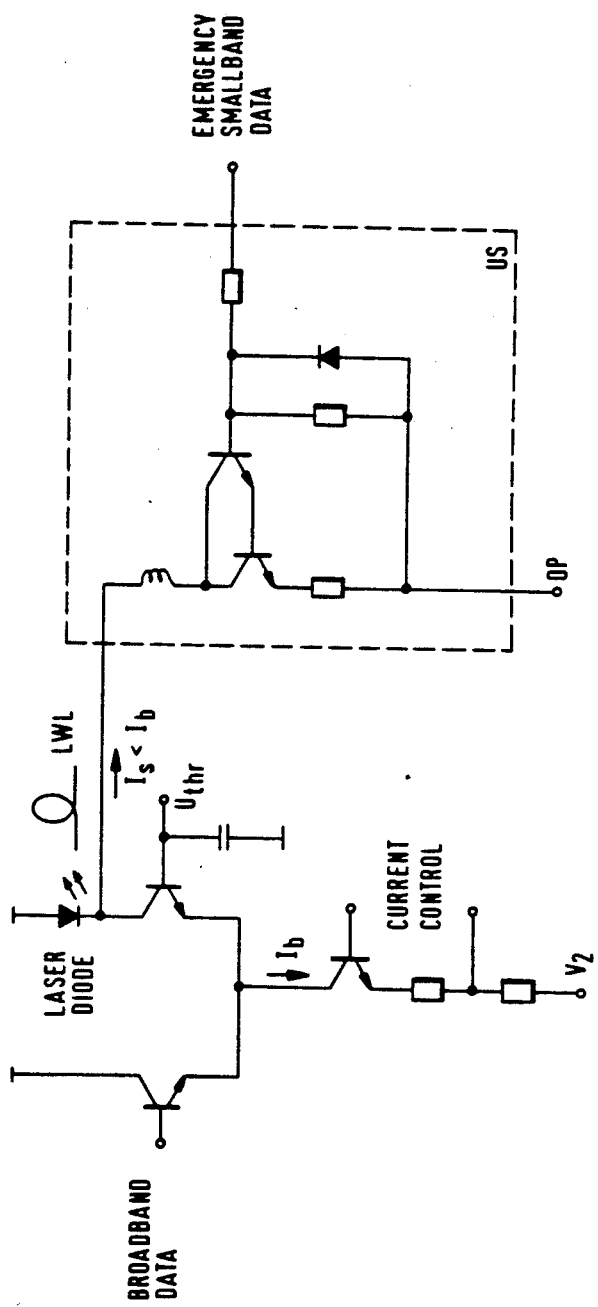
Figure 6:
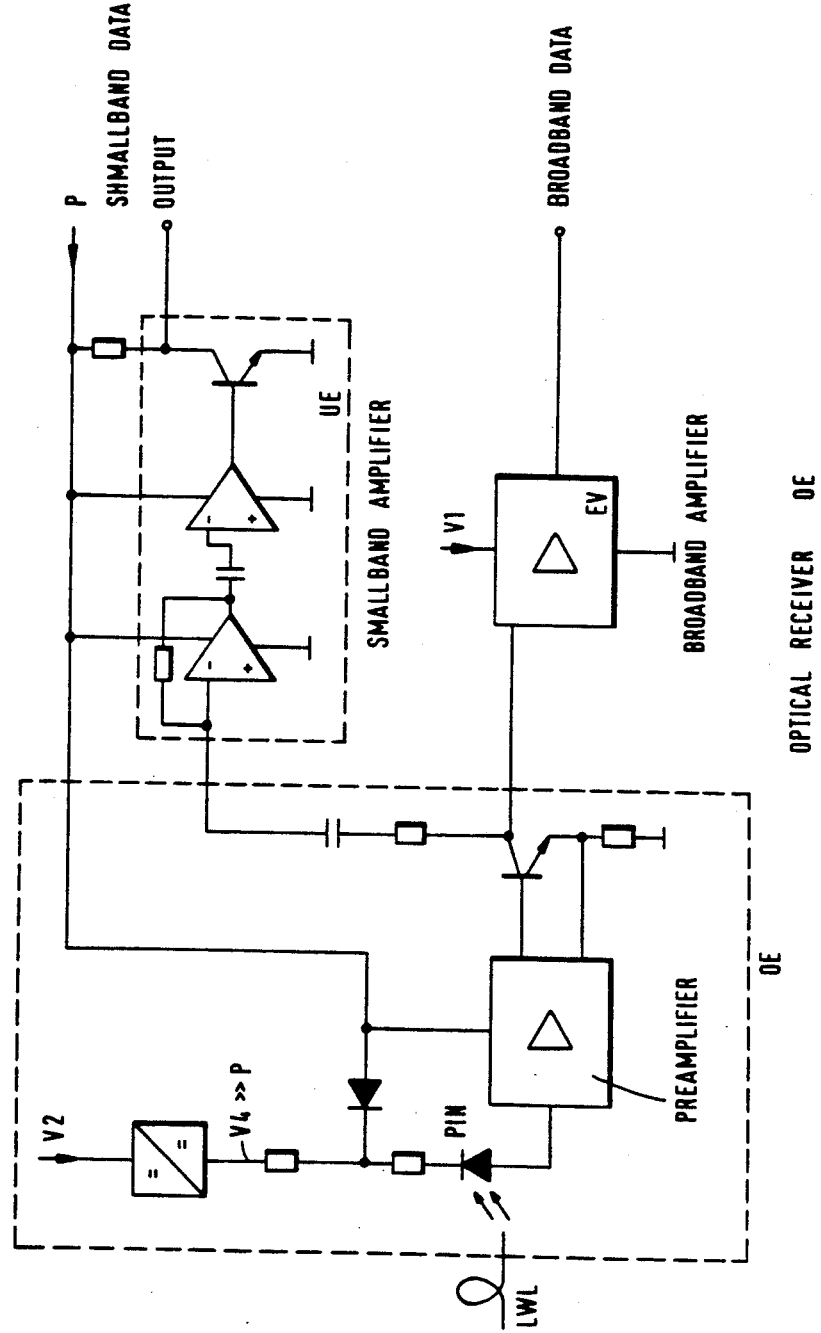

The optical transmitter and receiver may be realized as shown in FIGS. 5 and 6, respectively.

DESCRIPTION OF THE PREFERRED EMBODIMENTS

Figure 1:
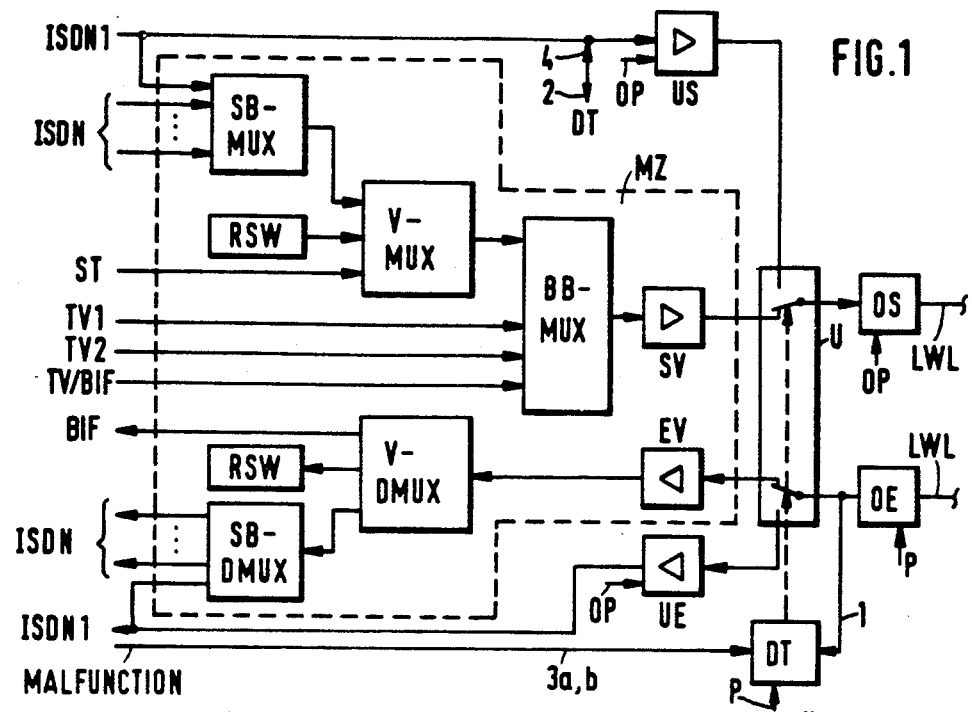
FIG. 1 is a block circuit diagram of the portion of a preferred embodiment of the invention at a central exchange.

FIG. 1 shows a three-stage multiplex forming apparatus in which narrowband signals ISDN are combined by a narrowband multiplexer SBMUX in a first stage, then, in a second stage premultiplexer VMUX the narrowband multiplex signals, a frame synchronizing word RSW as well as, for example, time multiplexed stereo sound signals ST are formed into a premultiplexed signal and in a third stage, a broadband multiplexer BBMUX, the output signal of the second stage multiplexer VMUX, television channels TV1 and TV2, and a further television channel TV or a videotelephone channel BIF are multiplexed and conducted via a transmitting amplifier SV and a switch U to an optical transmitter OS of a light conductor system LWL.

At the receiving end of the system of FIG. 1, demultiplexing takes place in only two stages, the output signal from an optical receiver OE being conducted via switch U and a receiving amplifier EV to a predemultiplexer VDMUX in which the narrowband multiplex signals, the frame sync word RSW and possibly video telephone channel BIF are recovered. The narrowband multiplex signals are then separated into the individual narrowband channels by a narrowband demultiplexer SBDMUX.

The circumvention arrangements according to the invention now include, at the transmitting end, a transmitting amplifier US which can conduct a selected narrowband channel ISDN1, for example a telephone channel, directly to the optical transmitter OS of the light conductor system following actuation of switch U. At the receiving end of the system of FIG. 1, the circumvention arrangement includes a receiving amplifier UE whose input is connected by the actuation of switch U, directly to the output of the optical receiver OE and furnishes at its output the narrowband channel signal ISDN1. ISDN is intended to identify the signals of a digital telephone instrument which operates, for example according to the burst mode. The transmitting and receiving amplifiers of the circumvention system may be highly narrowbanded and can thus be inexpensive and energy efficient. The above-mentioned burst mode is described in an article by B. S. Bosik of Bell Laboratories, entitled "The Case in favor of Burst-Mode Transmission for Digital Subscriber Loops" published in Proc. IEEE, ISSLS80, München, *NTG (Nachrichtentechnische Gesellschaft) - Fachbericht,* Vol. 73, pp. 26 et seq.

Also shown is a detector DT which is able to detect a signal indicating a malfunction, for example due to an error in the multiplex system MZ, to switch the system from multiplex operation to emergency service. The switches in the switching device U thus switch the channels to the circumvention arrangements. The multiplex system MZ is then completely inactive and can be switched off. During times when no connections are established, the circumvention devices US and UE, as well as the optical transmitter OS, may also be switched off, while only the optical receiver OE and the detector DT remain activated, the latter detecting a signal at the output of receiver OE indicating a desire for establishment of an incoming connection and a signal at the input of amplifier US indicating a desire for establishment of an outgoing connection, to thus switch the above-mentioned component groups back on.

Figure 2:
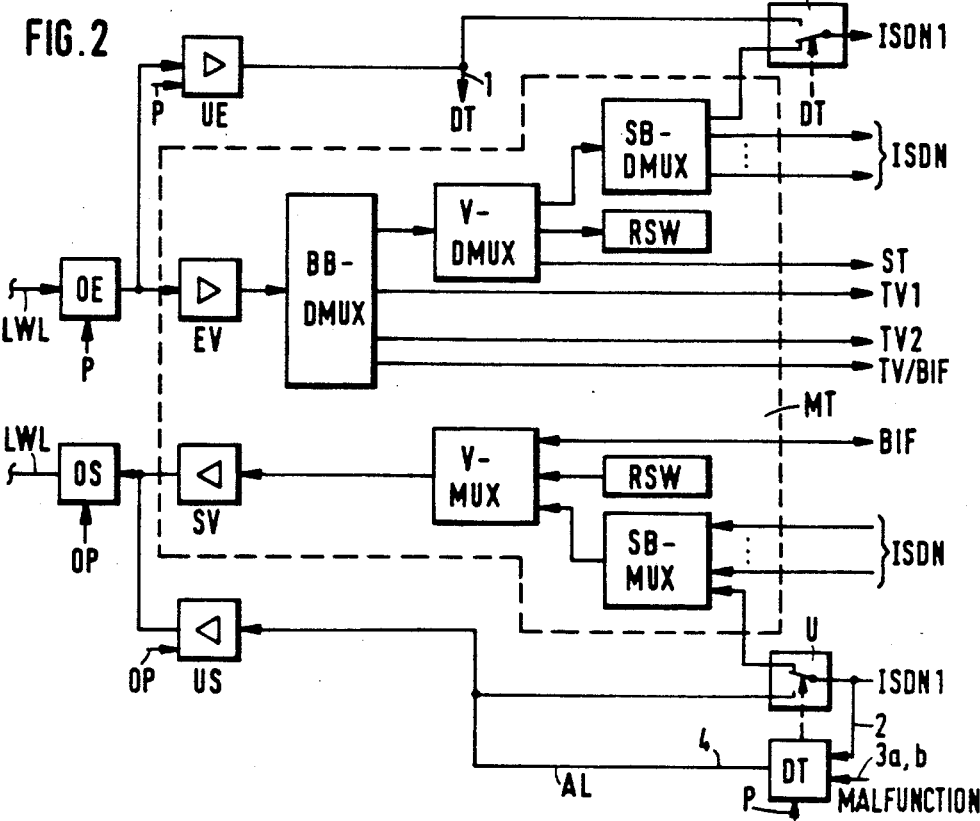
FIG. 2 is a block circuit diagram of a portion of the same embodiment as a subscriber terminal.

FIG. 2 shows the three-stage demultiplex devices and the two-stage multiplex devices at a subscriber terminal corresponding to the devices at the central exchange shown in FIG. 1. At the receiving end in the subscriber terminal, the electrical signal supplied by the optical receiver OE of the light conductor system LWL is amplified in the receiving amplifier EV and separated by the broadband demultiplexer BBDMUX into the broadband signals TV1, TV2, another television signal TV or possibly a video telephone signal BIF, and the premultiplex signal, which had been formed in multiplexer VMUX. In the second stage VDMUX, the premultiplex signal is separated into stereo sound ST, frame sync word RSW and narrowband multiplex signals, the latter being separated in a narrowband demultiplexer SBDMUX into the individual narrowband channel signals ISDN. At the transmitting end of the system of FIG. 2, the narrowband signals ISDN are combined in a narrowband multiplexer SBMUX and are multiplexed in a premultiplexer VMUX together with a frame sync word RSW and a videotelephone channel, and are transmitted via a transmitting amplifier SV to an optical transmitter OS of the light conductor system LWL.

The above-described multiplexer and amplifier component group MT can be circumvented according to the invention in favor of a selected emergency service channel ISDN1 by means of switches U' and circumvention arrangement elements including a transmitter US at the transmitting end and a receiver UE at the receiving end. Moreover, the same detector DT is provided to monitor the multiplex and amplifier component Group MT and the power supply and, in the case of a malfunction, actuates the switches U' and delivers an alarm signal AL to the circumvention path. When there is a lack of power, the multiplex and amplifier component group MT and, in times without traffic also the circumventing arrangements and the optical transmitter, are switched off. The latter are connected again under control of the detector DT when there is a desire to establish an incoming or outgoing call.

The approach according to the invention makes it possible to construct such a system in a modular manner in that the basic equipment includes only the telephone channel ISDN1, which requires only the circumvention arrangements and the detectors.

Instead of the two lightwave conductors, a single fiber with optical T-couplers can also be used, for example in the basic equipment or in the wavelength multiplex method, for example in the full system.

With the arrangement according to the invention, it is possible, for example if there is an interruption in the mains power, to continue operation for a much longer period without mains power in the devices at the subscriber's end because in the times without active exchanges power must be furnished by the emergency battery only to the monitoring detector and to the optical receiver and for a purely monitoring operation the latter power level can additionally be reduced.

At each terminal, operating power can be supplied to the circumvention, or emergency communication, elements from a charge accumulator in the form of a battery which is normally maintained charged by connection to the power mains via diodes, as shown in FIG. 3. The battery is connected directly via line P to detector DT, receiver OE and amplifier UE to maintain those elements operational. On the other hand, operating power is supplied to transmitter OS and amplifier US via a line OP which is connected to the battery via a switch rel 1 that is controlled by the associated detector DT when a call is to be placed or received.

Power supply lines P, OP for emergency communication are also needed in normal operation together with supply lines V1, V2 to optical means and line V3 to multiplexer, which latter lines are switched on via switch rel 2 after emergency operation being finished.

FIG. 4 shows 3 function blocks of detector DT. In the first one, call detector, incoming and outgoing calls are detected by rectifying the received data signal and detecting on hook signal of the subscriber, respectively. The rectified signal is integrated by an integration circuit, consisting of a resistor and a capacity and compared with a threshold voltage by an operational amplifier, activating a relay Rel 1. On hook signal sets a flop-flop, also activating the relay Rel 1.

The second block, named DT-control, consists of a CMOS-μ-Computer, e.g., COP 420 of National Semiconductor, with I/O-ports and 2 CMOS-data-registers, receiving burst and transmitting burst register, respectively.

In the emergency communication the received data, having an information portion b and a signalling portion Δ, is written in the receiving register. Only the Δ-part is given to the μ-Computer bus. In return, the acknowledge signal is written in the transmitting register and sent to the exchange. When there is a subscriber call, the call request is sent in the same way to the exchange.

The third block, named malfunction control, is activated by a power supply malfunction via line 3a or a multiplexer malfunction via line 36. In normal operation, having supply power V1, the relay Rel U' is activated and channel ISDN1 is connected to the SBMUX and SBDMUX.

With a malfunction signal, going from low to high, the relay will be currentless such that the channel ISDN1 will be connected to the circumvention. The malfunction signal is given to the I/O-port of the DT-control, which disactivates in case of power supply malfunction. The relay Rel 2, separating the power supply lines V1, V2 and V3 from the mains power supply. Then the DT control activates the relay Rel 1 in order to connect the battery to the line OP. Now the amplifier US and the optical transmitter OS are supplied. An alarm signal AL, originated in the μ-Computer and fed to the Δ-portion of the transmitting burst register is sent to the detector DT in the exchange, where the circumvention will be connected and an acknowledge-signal will be transmitted to the DT-control of the subscriber.

The optical transmitter OS as shown in FIG. 5 has 2 inputs, broadband data for normal operation and emergency smallband data for emergency operation. In normal operation the second input is blocked down, so that the branch between laser diode and supply line OP is high resistant, while in the other branch because of the differential amplifier arrangement a current of about 200 mA is flowing always (Ib).

In case of emergency operation the power supply line V2 is cut off and a current Is, which is very smaller than broadband current Ib, flows through the laser diode, provided by the amplifier US, but only if positive smallband data pulses are to send.

The optical receiver OE as illustrated in FIG. 6 has two outputs, which are connected to the smallband amplifier UE and to the broadband amplifier EV, respectively. In case of power supply malfunction power supply lines V1 and V2 are cut off such that the high voltage V4 of about 100 Vs, generated in the optical receiver for the PIN-diode, breaks down and is substituted by a very smaller voltage P. Energy consumption of the smallband arrangement is very smaller than that of the broadband arrangement.

The detector DT in the exchange is the same one like in the subscriber terminal and is fixed associated to a single subscriber line.

It will be understood that the above description of the present invention is susceptible to various modifications, changes and adaptations, and the same are intended to be comprehended within the meaning and range of equivalents of the appended claims.

What is claimed is:

1. In a service integrated, time multiplex digital signal transmission system for transmitting narrowband and broadband signals between a central exchange terminal and a subscriber terminal, which system includes means defining a light conductor path connected between the terminals, a transmitter device at one terminal composed of sources of such narrowband and broadband signals and signal processing means conductively connected to the sources for receiving the signals provided by the sources and for combining the signals provided by the sources into a multiplex signal and for supplying such multiplex signal to the light conductor path, and a receiver device at the other terminal composed of signal processing means connected to the light conducting path for receiving multiplex signals from that path and separating the received multiplex signals into narrowband signals and broadband signals, the device at the subscriber terminal being normally supplied with operating power by local utility mains, a charge accumulator at the subscriber terminal conductively connected to the device at the subscriber terminal for supplying operating power thereto in the event of interruption of the power supply provided by the local mains, and means connected to the device at the one terminal for switching the system into an operating state in which the system effects signal transmission at a reduced bit rate in the event of such local mains power interruption, the improvement wherein:

one of said devices comprises emergency transmitting means for producing a narrowband signal and connected in signal conducting relation to the light conductor path for supplying such signal to the light conductor path;

the other of said devices comprises emergency receiving means for receiving the narrowband signal produced by said emergency transmitting means and connected in signal conducting relation to the light conductor path for receiving such signal from the light conductor path; and said switching means comprise detector means located at one of the terminals for detecting a local mains power interruption, and switching members connected between said detector means and said device at said one terminal for responding to detection of such power interruption to deactivate said signal processing means at said one terminal and activate said emergency means at said one terminal.

2. A system as defined in claim 1 wherein said detector means are further arranged to detect a malfunction in said signal processing means at said one terminal.

3. A system as defined in claim 2 wherein: said one of said terminals at which said detector means is located is said terminal at which said one of said devices is located, and said detector means transmits an alarm signal over the light conductor path upon detecting a mains power interruption or signal processing means malfunction; and said switching means further comprises second detector means located at the other one of said terminals for detecting an alarm signal transmitted over the light conductor path, and second switching members connected between said second detector means and said other device at said other terminal for responding to detection of such alarm signal to deactivate said signal processing means at said other terminal and activate said emergency receiving means.

4. A system as defined in claim 2 wherein: said detector means are located at said terminal at which said other device is located and are further operative, when said signal processing means at said other device are deactivated and said emergency receiving means are activated, to detect the presence of a narrowband signal produced by said emergency transmitting means for supplying operating power from said accumulator to a part of said emergency receiving means only when such narrowband signal is present; and said other device comprises an optical receiver connected to the light conductor path, and means permanently connecting said accumulator only to said optical receiver and said first-recited detector means.

5. A system as defined in claim 4 wherein said means permanently connecting said accumulator to said optical receiver comprise means for supplying operating power at a reduced level to said optical receiver when said emergency receiving means are activated.

6. A system as defined in claim 1 wherein each said emergency means comprises an amplifier.

7. A system as defined in claim 6 wherein each said emergency means further comprises means supplying operating power at a reduced level to its associated amplifier when said emergency means at said one terminal are activated.

8. A system as defined in claim 6 or 7 wherein each said emergency means further comprises means reducing the operating bandwidth of its associated amplifier when said emergency means at said one terminal are activated.

9. A system as defined in claim 1 wherein transmission between said terminals is conducted according to the burst mode.

10. A system as defined in claim 1 wherein said emergency transmitting means is connected to the light conductor path for directly supplying the narrowband signal to the light conductor path, said emergency receiving means is connected to the light conductor path for directly receiving such signal from the light conductor path, and both said emergency means are electrically independent of both said signal processing means.

* * * * *